US008310589B2

(12) United States Patent
Okamoto

(10) Patent No.: US 8,310,589 B2
(45) Date of Patent: Nov. 13, 2012

(54) DIGITAL STILL CAMERA INCLUDING SHOOTING CONTROL DEVICE AND METHOD OF CONTROLLING SAME

(75) Inventor: Satoshi Okamoto, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 444 days.

(21) Appl. No.: 12/508,335

(22) Filed: Jul. 23, 2009

(65) Prior Publication Data

US 2010/0020198 A1 Jan. 28, 2010

(30) Foreign Application Priority Data

Jul. 28, 2008 (JP) ................................. 2008-192948

(51) Int. Cl.
*H04N 5/235* (2006.01)
*G03B 7/00* (2006.01)
(52) U.S. Cl. ........................................................ 348/362
(58) Field of Classification Search .................... 348/362
See application file for complete search history.

(56) References Cited

U.S. PATENT DOCUMENTS 7,452,144 B2 * 11/2008 Tokiwa et al. ................. 396/502
7,796,163 B2 * 9/2010 Sugimoto ................... 348/222.1
2007/0189753 A1 * 8/2007 Koguchi et al. ............... 396/166
2008/0043135 A1 * 2/2008 Sugimoto ....................... 348/345
2009/0262233 A1 * 10/2009 Nagahata et al. .............. 348/341
2010/0026836 A1 * 2/2010 Sugimoto ................... 348/223.1

FOREIGN PATENT DOCUMENTS

JP 3974798 B2 6/2007

* cited by examiner

*Primary Examiner* — Jason Chan
*Assistant Examiner* — Gary C Vieaux
(74) *Attorney, Agent, or Firm* — McGinn IP Law Group, PLLC

(57) ABSTRACT

Disclosed is a digital still camera in which amount of exposure is decided appropriately even when there is a changeover from one shooting scene to another. When a shooting mode is set, a first shooting scene discrimination is performed before a shutter-release button is half-pushed. A first amount of exposure is calculated using a program diagram suited to the shooting scene that has been discriminated by the first shooting scene discrimination. Shooting for focusing control is performed at an exposure corresponding to the first amount of exposure, whereby image data is obtained. Focusing control is carried out based upon the image data obtained, and shooting is performed again. Second shooting scene discrimination is performed based upon the image data obtained by shooting. A second amount of exposure is calculated using a program diagram suited to the shooting scene that has been discriminated by the second shooting scene discrimination. Shooting for recording purposes is performed at the exposure corresponding to the second amount of exposure and the image data obtained is recorded.

6 Claims, 9 Drawing Sheets

PROGRAM DIAGRAM FOR
PORTRAIT SHOOTING SCENE

PROGRAM DIAGRAM FOR
LANDSCAPE SHOOTING SCENE

DIGITAL STILL CAMERA INCLUDING SHOOTING CONTROL DEVICE AND METHOD OF CONTROLLING SAME

BACKGROUND OF THE INVENTION

1. Field of the Invention

This invention relates to a digital still camera and to a method of controlling the camera.

2. Description of the Related Art

A program diagram is utilized in order to decide amount of exposure in a digital still camera. For example, according to the specification of Japanese Patent No. 3974798 (Japanese Patent Publication No. 2003-259200), in an instance where a plurality of images obtained by shooting at different exposures are combined to generate a single image, reference luminance values of respective ones of zone metering areas are set. Then, from among exposure conditions regarding luminance reference values of luminance areas that include luminance values within the focusing range, an exposure condition is decided by selecting it from a program diagram so as to obtain a high shutter speed.

In a case where amount of exposure is decided utilizing a program diagram conforming to a shooting scene, there are instances where a shooting scene that prevailed when a scene determination was made and the shooting scene at the time of actual recording will differ when the shooting scenes are changed over frequently. There are occasions where the amount of exposure at the time of recording is decided using a program diagram suited to a shooting scene that is different from the shooting scene at the time of recording. As a consequence, there are instances where amount of exposure cannot be decided appropriately.

SUMMARY OF THE INVENTION

An object of the present invention is to so arrange it that amount of exposure can be decided comparatively appropriately even when a shooting scene is changed over.

According to the present invention, the foregoing object is attained by providing a digital still camera comprising: a shutter-release button of two-step stroke type; an image sensing device for repeatedly imaging a subject and outputting image data, which represents the image of the subject, at a fixed period in accordance with setting of a shooting mode; a first shooting scene discriminating device (first shooting scene discriminating means) for discriminating a shooting scene of the subject of the image represented by the image data that has been output from the image sensing device; a first photometric value calculating device (first photometric value calculating means) responsive to pushing of the shutter-release button through a first step thereof for calculating a photometric value representing subject luminance using the image data that has been output from the image sensing device; a first exposure amount deciding device (first exposure amount deciding means) for deciding an amount of exposure, which corresponds to the photometric value calculated by the first photometric value calculating device, using a program diagram for the shooting scene discriminated by the first shooting scene discriminating device; a first shooting control device (first shooting control means) for controlling the image sensing device so as to image the subject at the amount of exposure decided by the first exposure amount deciding device; a focusing control device (focusing control means) for positioning an imaging lens based upon image data that has been output from the image sensing device by shooting the subject under the control of the first shooting control device; a second shooting control device (second shooting control means) for controlling the image sensing device in such a manner that the amount of exposure will become that decided by the first exposure amount deciding device and the subject will be shot at a position where the imaging lens has been positioned by the focusing control device; a second shooting scene discriminating device (second shooting scene discriminating means) for discriminating a shooting scene of the subject represented by image data that has been output from the image sensing device by shooting the subject under the control of the second shooting control device; a second exposure amount deciding device (second exposure amount deciding means) for deciding an amount of exposure, which corresponds to the photometric value calculated by the first photometric value calculating device, using a program diagram for the shooting scene discriminated by the second shooting scene discriminating device; a third shooting control device (third shooting control means) responsive to pushing of the shutter-release button through a second step thereof for controlling the image sensing device so as to image the subject at the amount of exposure decided by the second exposure amount deciding means; and a recording control device (recording control means) for recording image data, which is output from the image sensing device by shooting the subject under the control of the third shooting control device, on a recording medium.

The present invention also provides a control method suited to the digital still camera described above. Specifically, the method comprises the steps of: an image sensing device repeatedly imaging a subject and outputting image data, which represents the image of the subject, at a fixed period in accordance with setting of a shooting mode; a first shooting scene discriminating device discriminating a shooting scene of the subject of the image represented by the image data that has been output from the image sensing device; in response to pushing of a shutter-release button through a first step thereof, a first photometric value calculating device calculating a photometric value representing subject luminance using the image data that has been output from the image sensing device; a first exposure amount deciding device deciding an amount of exposure, which corresponds to the photometric value calculated by the first photometric value calculating device, using a program diagram for the shooting scene discriminated by the first shooting scene discriminating device; a first shooting control device controlling the image sensing device so as to image the subject at the amount of exposure decided by the first exposure amount deciding device; a focusing control device positioning an imaging lens based upon image data that has been output from the image sensing device by shooting the subject under the control of the first shooting control device; a second shooting control device controlling the image sensing device in such a manner that the amount of exposure will become that decided by the first exposure amount deciding device and the subject will be shot at a position where the imaging lens has been positioned by the focusing control device; a second shooting scene discriminating device discriminating a shooting scene of the subject represented by image data that has been output from the image sensing device by shooting the subject under the control of the second shooting control device; a second exposure amount deciding device deciding an amount of exposure, which corresponds to the photometric value calculated by the first photometric value calculating device, using a program diagram for the shooting scene discriminated by the second shooting scene discriminating device; in response to pushing of the shutter-release button through a second step thereof, a third shooting control device controlling the image sensing device so as to image the subject at the amount of exposure decided by the second exposure amount deciding means; and a recording control device recording image data, which is output from the image sensing device by shooting the subject under the control of the third shooting control device, on a recording medium.

In accordance with the present invention, first shooting scene discrimination processing is executed before a shutter-release button is pushed through a first step thereof. In order to position an imaging lens for focusing control, use is made of image data captured at an amount of exposure calculated using a program diagram suited to the shooting scene discriminated by the first shooting scene discrimination processing. When image data is recorded, second shooting scene discrimination processing is executed using image data captured at the position of an imaging lens that has been positioned for the sake of focusing control, and the amount of exposure is calculated again using a program diagram suited to a shooting scene discriminated by the second shooting scene discrimination processing. If the shutter-release button is pushed through a second step thereof, the subject is shot at the re-calculated amount of exposure and the image data obtained by such imaging is recorded on a recording medium. Since shooting scene discrimination for deciding amount of exposure at recording of image data is executed in addition to shooting scene discrimination for focusing control, the shooting scene at the time of recording of the image data can be discriminated accurately and the amount of exposure can be decided comparatively accurately.

The digital still camera may further comprise a scene determination device (scene determination means) for determining whether the shooting scene discriminated by the first shooting scene discriminating device and the shooting scene discriminated by the second shooting scene discriminating device are the same shooting scene; and a device (means) responsive to a determination by the scene determination device that the shooting scenes are the same shooting scene for controlling the second exposure amount deciding device so as to halt exposure amount decision processing, and controlling the third image control device so as to image the subject at the amount of exposure decided by the first exposure amount deciding device.

The digital still camera may further comprise a second photometric value calculating device (second photometric calculating means), which is responsive to the fact that the shooting scene has been discriminated by the second shooting scene discriminating device, for calculating a photometric value representing subject luminance. In this case, the second exposure amount deciding device would decide an amount of exposure, which corresponds to the photometric value calculated by the second photometric value calculating device, using the program diagram for the shooting scene discriminated by the second shooting scene discriminating device.

The first photometric value calculating device calculates a photometric value representing subject luminance using a plurality of frames of image data that have been output from the image sensing device by performing imaging a plurality of times.

The apparatus may further comprise an image memory responsive to pushing of the shutter-release button through the first step thereof for storing the image data that has been output from the image sensing device. In this case, the first photometric value calculating device would calculate a photometric value representing subject luminance using the image data that has been stored in the image memory.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described with reference to the drawings.

Figure 1:
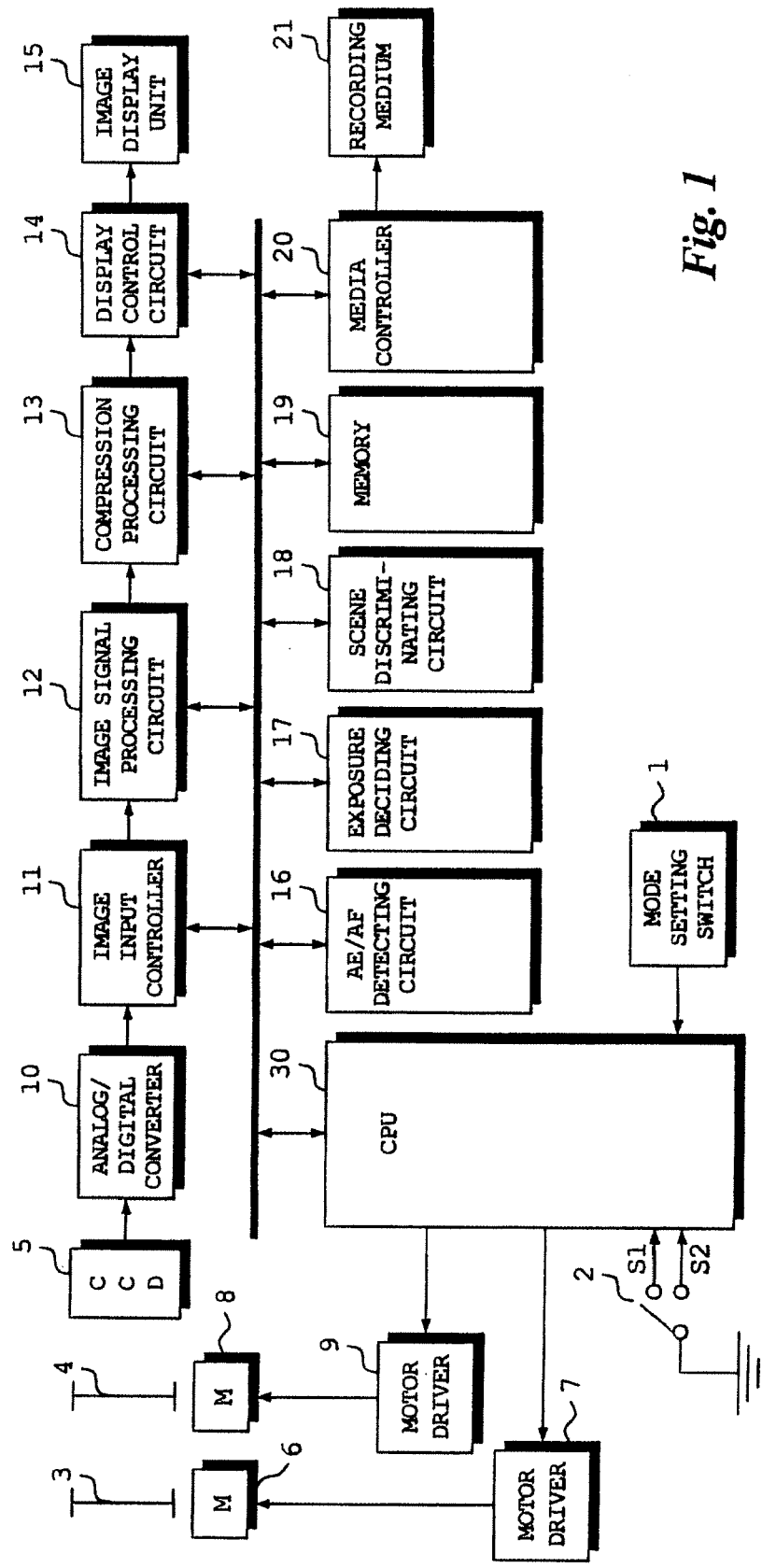
FIG. 1 is a block diagram illustrating the electrical configuration of a digital still camera.

FIG. 1 is a block diagram illustrating the electrical configuration of a digital still camera according to an embodiment of the present invention.

The operation of the overall digital still camera is controlled by a CPU 30.

The digital still camera is provided with a mode setting switch 1 for setting a shooting mode, a playback mode and other modes. A mode setting signal that has been output from the mode setting switch 1 is input to the CPU 30. The digital still camera is further provided with a shutter-release switch 2 of two-step stroke type. Also input to the CPU 30 are a signal S1 indicating that the shutter-release switch 2 has been pushed through the first step thereof and a signal S2 indicating that the shutter-release switch 2 has been pushed through the second step thereof.

A zoom lens 3 and a focusing lens 4 are provided in front of a CCD 5 and are freely movable along the optic axis. The zoom position of the zoom lens 3 is decided by a zoom motor 6 controlled by a motor driver 7. The position of the focusing lens 4 is decided by a focus motor 8 controlled by a motor driver 9.

If the shooting mode is set by the mode setting switch 1, the image of the subject is sensed repeatedly by the CCD 5 and a video signal representing the image of the subject is output repeatedly at a fixed period. The video signal representing the image of the subject is input to an analog/digital converting circuit 10, which converts the video signal to digital image data. The digital image data obtained by the conversion is input to an image signal processing circuit 12 via an image input controller 11. The image signal processing circuit 12 executes prescribed signal processing such as a gamma correction and white balance adjustment.

The image data that has been output from the image signal processing circuit 12 is input to an AE (automatic exposure)/AF (automatic focus) detecting circuit 16. The latter meters the subject luminance based upon the entered image data and calculates a photometric value. Data representing the calculated photometric value is input to an exposure deciding circuit 17. Data representing a plurality of program diagrams suited to shooting scenes has been stored in the exposure deciding circuit 17, as will be described later. Factors that decide the amount of exposure, such as the f-stop number of the iris (not shown) and the shutter speed (so-called electronic shutter) are decided based upon a program diagram. Further, the AE/AF detecting circuit 16 decides the lens position of the focusing lens 4 based upon the contrast of the entered image data. The imaging of the subject is repeated at the amount of exposure and lens position that have been decided. The AE/AF detecting circuit 16 further calculates the distance to the subject based upon the lens position of the focusing lens 4 decided.

The digital still camera is provided with a scene discriminating circuit 18. The scene discriminating circuit 18 discriminates the shooting scene. Examples of shooting scenes that can be discriminated are a portrait shooting scene, a macro shooting scene, a landscape shooting scene and a night shooting scene, etc.

The scene discriminating circuit 18 also has a face detecting function. The image data that has been output from the image signal processing circuit 12 is input to the scene discriminating circuit 18. Whether the image of the subject represented by the entered image data contains a face image is detected. It is determined that the scene is the portrait shooting scene if it is detected that the image of the shot subject contains a face image.

Items of data representing the photometric value and subject distance detected by the AE/AF detecting circuit 16 are input to the scene discriminating circuit 18. If the scene is not the portrait shooting scene, it is determined that the scene is the macro shooting scene when the distance to the subject is tens of centimeters; the landscape shooting scene when the photometric value is several tens of Ev or more; and the night shooting scene when the photometric value is less than 3 to 4 Ev. When neither the portrait shooting scene, macro shooting scene, landscape shooting scene and night shooting scene can be discriminated, it is determined that the scene is the normal shooting scene.

The digital still camera is provided with the exposure deciding circuit 17, as mentioned above. On the basis of the photometric value, the exposure deciding circuit 17 decides an amount of exposure (f-stop number and shutter speed) using whichever program diagram among the plurality thereof that corresponds to the shooting scene discriminated.

The image data that has been output from the image signal processing circuit 12 is applied to a display control circuit 14 upon passing through a compression processing circuit 13. By controlling an image display unit 15 using the display control circuit 14, the image of the subject shot repeatedly is displayed on the display screen of the image display unit 15.

If the shutter-release switch 2 is pushed through the second step of its two-step stroke in a case where the shooting mode has been set, then calculation of a photometric value, decision of amount of exposure for focusing control, positioning of the focusing lens 4, discrimination of the shooting scene, decision of amount of exposure for recording image data and shooting at the amount of exposure decided are all executed again, whereby image data is output from the image signal processing circuit 12 in the manner described above. The image data that has been output from the image signal processing circuit 12 is compressed in the compression processing circuit 13 and then stored in a memory 19 temporarily. The image data is read out of the memory 19 and is then recorded on a recording medium 21 such as a memory card by a media controller 20.

Figure 2A:
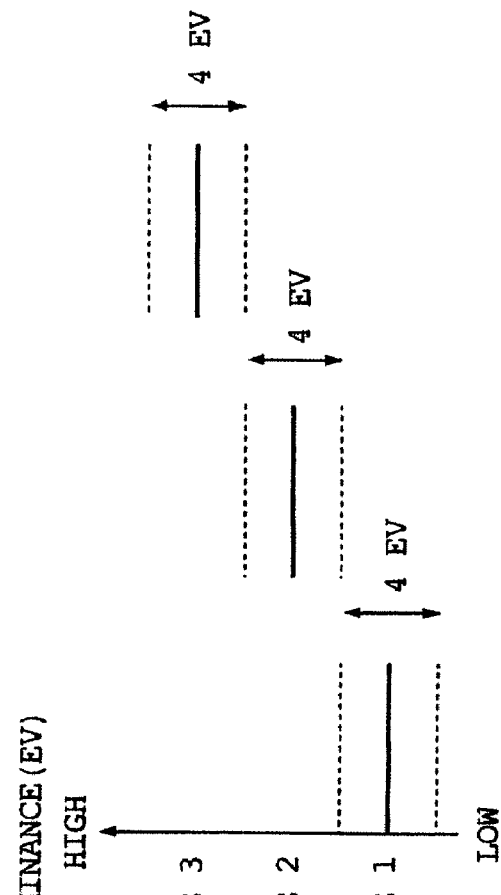
FIGS. 2A and 2B illustrate the relationship between exposure setting and brightness that can be measured at this exposure.
Figure 2B:
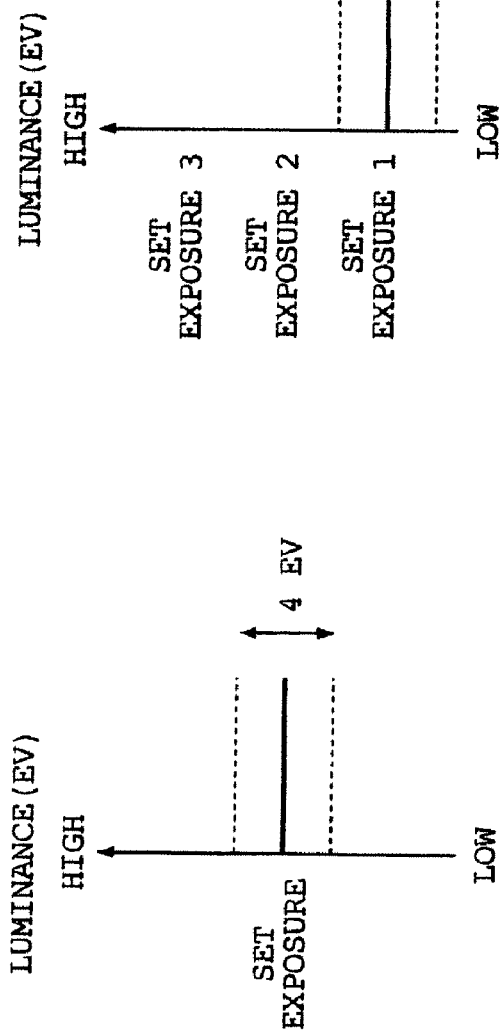

FIGS. 2A and 2B illustrate the relationship between exposure control processing and subject brightness. FIG. 2A illustrates this relationship at the time of capture of a so-called "through-the-lens" image, namely when the shooting mode has been set but the shutter-release switch 2 has not yet been pushed through the first step of its stroke. FIG. 2B illustrates this relationship after the shutter-release switch 2 has been push through the first step of its stroke.

With reference to FIG. 2A, the dynamic range of the CCD 5 is a comparatively narrow 4 Ev. At the time of through-the-lens shooting, the amount of exposure is decided using one frame of image data that has been obtained by shooting one time, and the exposure is set (the iris is set and the shutter speed is set) based upon the amount of exposure decided. The decision of amount of exposure and the exposure setting are thus repeated every single shot. Since the dynamic range of the CCD 5 is comparatively narrow, there are instances where the amount of exposure cannot be decided accurately at the set exposure.

With reference to FIG. 2B, when the shutter-release switch 2 is pushed through the first step of its stroke, the amount of exposure is decided using one frame of image data that has been obtained by the first shot, and the first exposure is set ("SET EXPOSURE 1") based upon the amount of exposure decided. A second exposure different from the first exposure is set ("SET EXPOSURE 2"). Furthermore, a third exposure different from the first and second exposures is set ("SET EXPOSURE 3"). The amount of exposure for focusing control is calculated using these three frames of image data obtained by shooting performed three times under exposure control performed three times. Even though the dynamic range of the CCD 5 is narrow, the amount of exposure can be calculated comparatively accurately.

Figure 3:
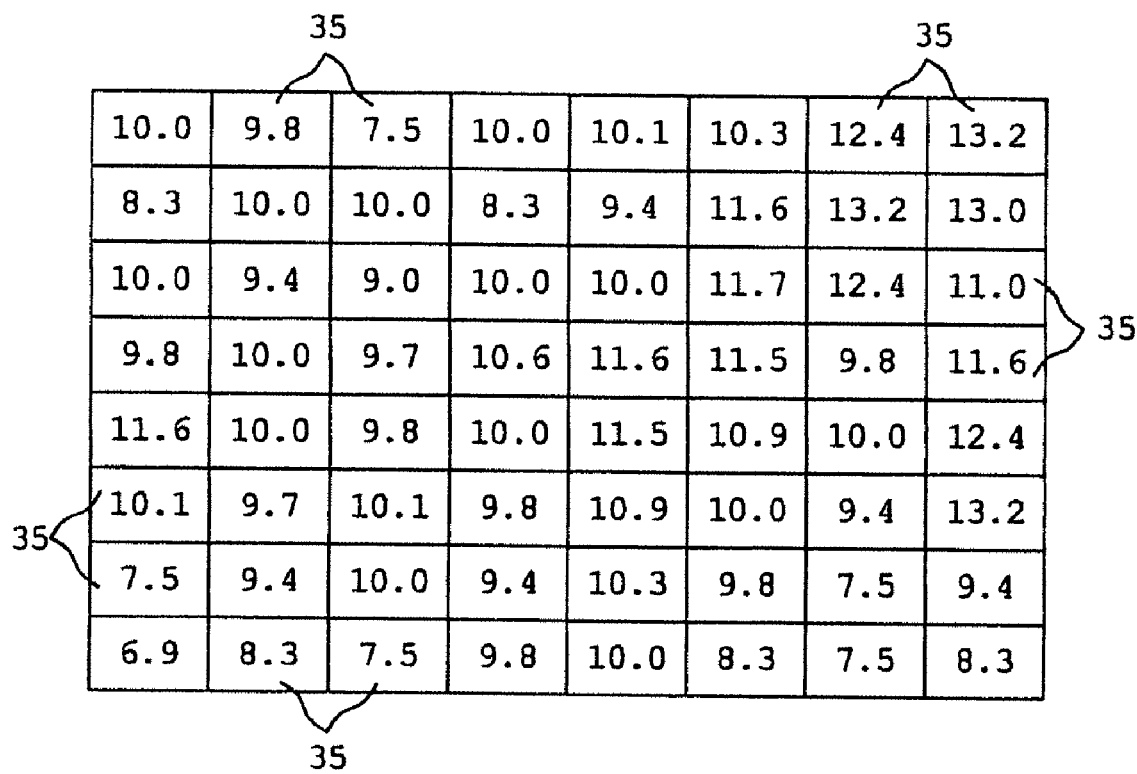
FIG. 3 illustrates an example of photometric values.

FIG. 3 illustrates an example of photometric values that have been calculated.

The imaging area has been divided into 64 zones 35 in an 8×8 array of eight zones horizontally and eight zones vertically. A photometric value (Ev value) has been calculated for every zone 35. By using these photometric values, amount of exposure at the time of shooting for focusing control and amount of exposure at the time of shooting for recording are decided. It goes without saying that zone metering need not necessarily be performed.

Figure 4A:
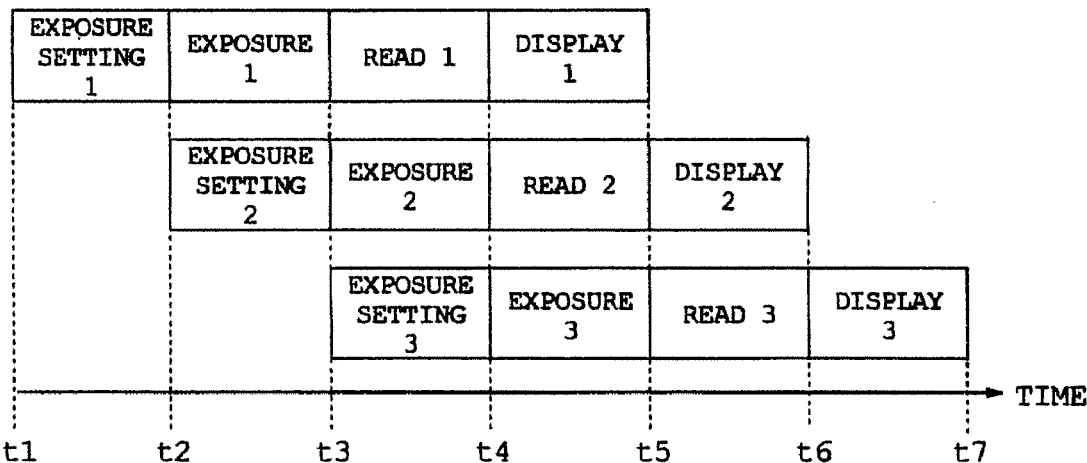
FIGS. 4A and 4B illustrate setting of exposure to display of the image of a subject.
Figure 4B:
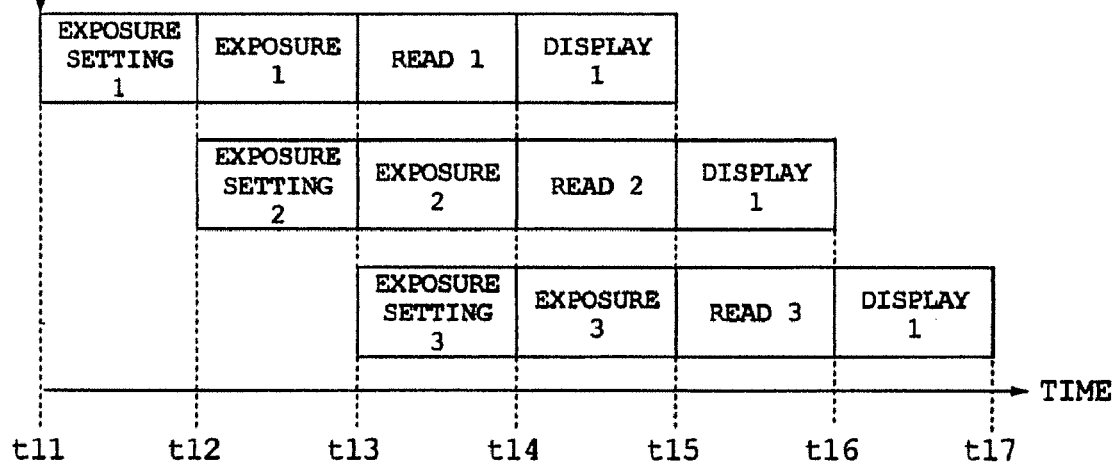

FIGS. 4A and 4B are time charts of time from setting of exposure to display. FIG. 4A illustrates a case where through-the-lens shooting is in effect, and FIG. 4B illustrates a case where the shutter-release switch 2 has been pushed through the second step of its stroke.

With reference to FIG. 4A, amount of exposure is decided from time t1 to t2 based upon image data that was obtained by shooting prior to time t1, and exposure is set based upon this amount of exposure ("EXPOSURE SETTING 1"). Exposure is performed ("EXPOSURE 1") at the set exposure from time t2 to t3. Further, amount of exposure is decided from time t2 to t3 based upon image data that was obtained by shooting previously, and exposure is set ("EXPOSURE SETTING 2").

From time t3 to t4, image data obtained by exposure from time t2 to t3 is read out ("READ 1"), the next exposure is carried out ("EXPOSURE 2") and the next exposure setting is made ("EXPOSURE SETTING 3"). From time t4 to t5, the image of the subject represented by image data read out from time t3 to t4 is displayed ("DISPLAY 1"). Further, image data obtained by exposure from time t3 to t4 is read out ("READ 2") and the next exposure is carried out ("EXPOSURE 3"). Display of the image of the subject ("DISPLAY 2") and read-out of the image ("READ 3") are carried out from time t5 to t6, and display of the image of the subject is performed from time t6 to t7.

Thus, at the time of through-the-lens shooting prior to pushing of the shutter-release switch 2 through the first step, the decision of amount of exposure, exposure control and display of the image of the subject are carried out repeatedly using the image data obtained by one frame's worth of shooting. Since the dynamic range of the CCD 5 is comparatively narrow, a comparatively accurate decision of amount of exposure cannot be achieved, as mentioned earlier. In addition, when through-the-lens shooting is performed, an iris setting is made that is suited to display of the image of the subject. As a result, there are instances where this is not an iris setting that is suited to control of focus.

With reference to FIG. 4B, after the shutter-release switch 2 is pushed through the first step of its stroke at time t11; an exposure setting is made from time t11 to t12 ("EXPOSURE SETTING 1"); exposure ("EXPOSURE 1") and an exposure setting ("EXPOSURE SETTING 2") are carried out from time t12 to t13; read-out ("READ 1"), exposure ("EXPOSURE 2") and ("EXPOSURE SETTING 3") are carried out from time t13 to t14; and display of the image of the subject ("DISPLAY 1"), read-out ("READ 2") and ("EXPOSURE 3") are performed from time t14 to t15. After the shutter-release switch 2 is pushed, the image of the subject displayed from time t14 to t15, the image of the subject displayed from time t15 to t16 and the image of the subject displayed from time t16 to t17 were all exposed from time t12 to t13. The exposure setting performed the third time results in a different amount of exposure so as to cover all brightnesses of the subject. The photometric value of the subject is calculated using three frame's worth of image data (read out from time t13 to t16) that was captured by exposure performed three times.

Figure 5A:
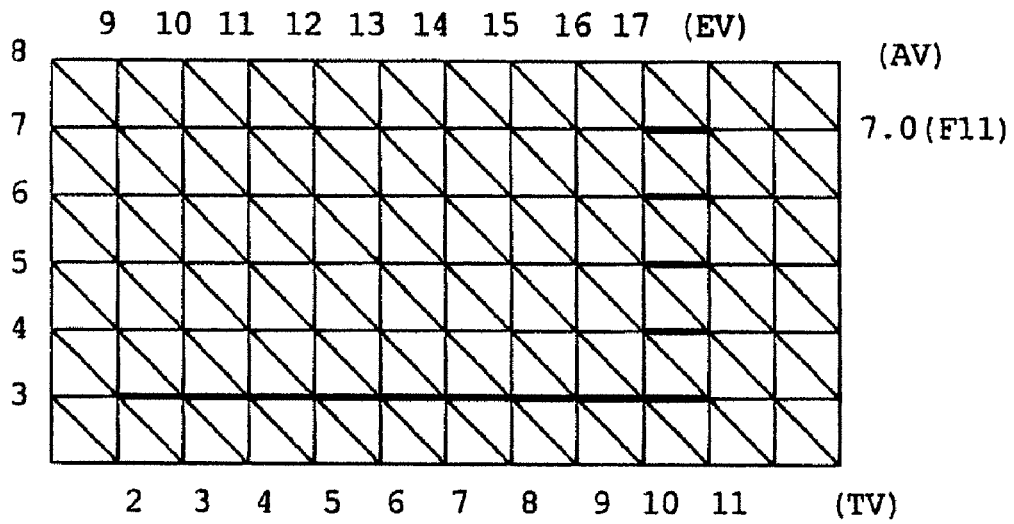
FIGS. 5A and 5B are examples of program diagrams.
Figure 5B:
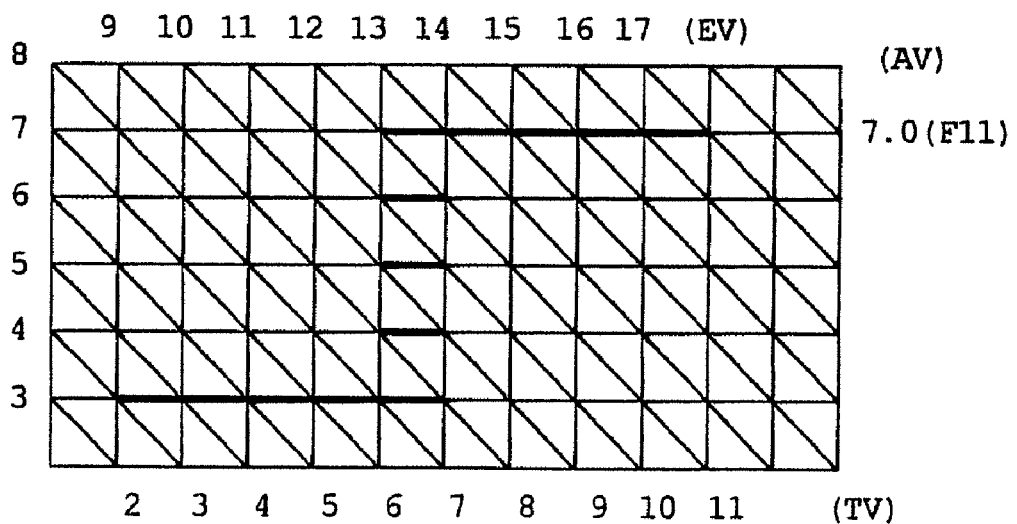

FIGS. 5A and 5B are examples of program diagrams.

FIG. 5A is a program diagram for the portrait shooting scene. The portrait shooting scene is adapted so as to present a sharp image of a person. To achieve this, the program diagram for the portrait shooting scene has been designed to open the iris so that the depth of field of the subject will be small.

FIG. 5B is a program diagram for the landscape shooting scene. The landscape shooting scene is adapted so as to present a sharp image from short to long distances. To achieve this, the program diagram for the landscape shooting scene has been designed to stop down the iris so that the depth of field will be large.

Only a program diagram for the portrait shooting scene and a program diagram for the landscape shooting scene have been illustrated. It goes without saying, however, that data representing program diagrams for other shooting scenes also has been stored in the exposure deciding circuit 17.

Figure 6:
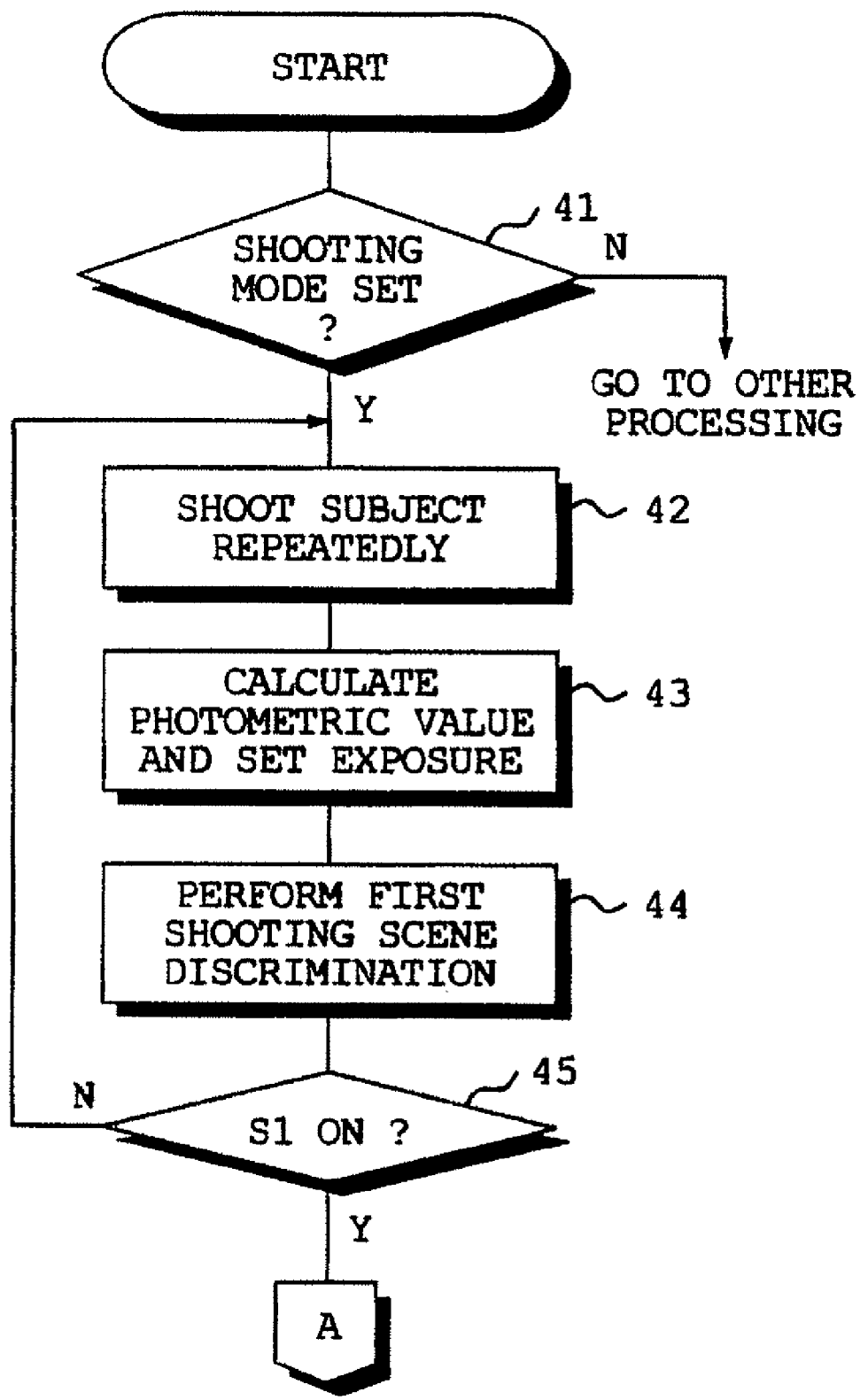
FIGS. 6 to 9 illustrate an example of processing executed by the digital still camera.
Figure 7:
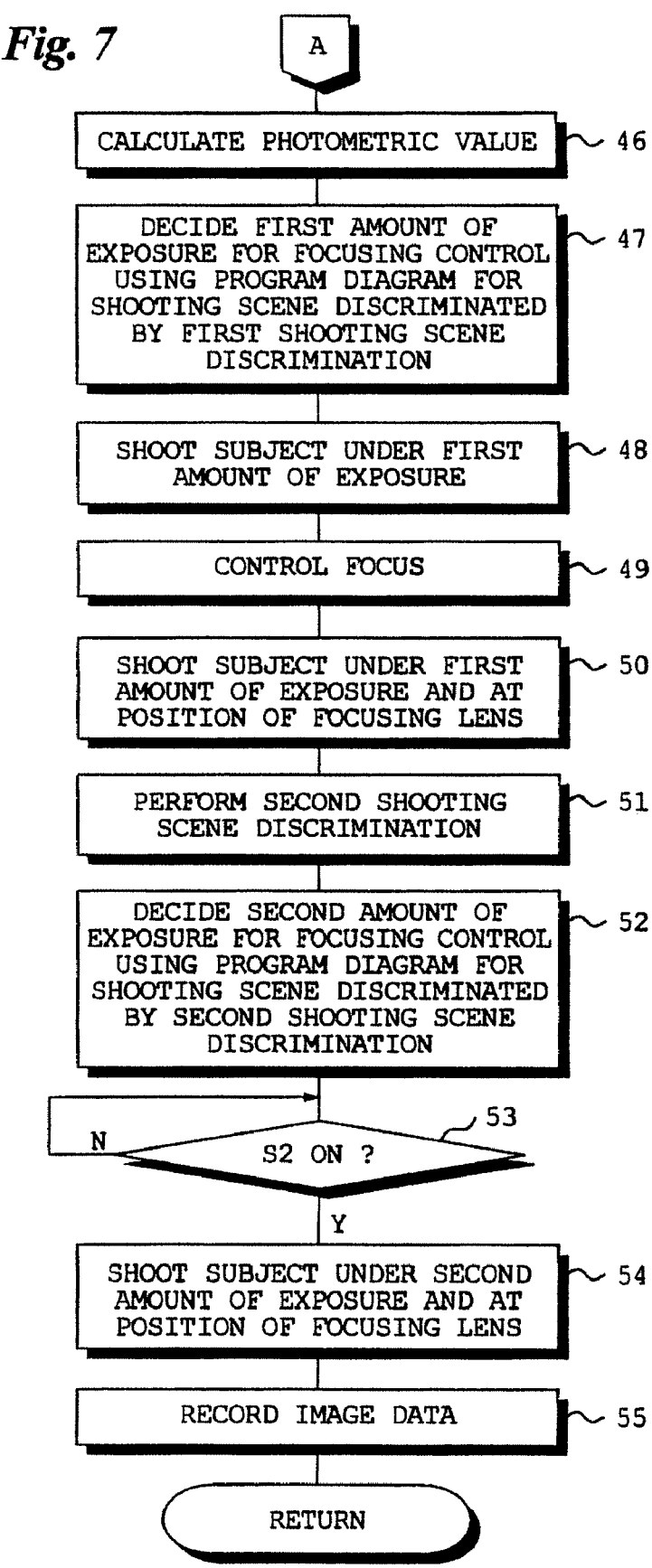

FIGS. 6 and 7 are flowcharts illustrating processing executed by the digital still camera.

According to this processing, when the shooting mode is set, the subject is shot at an amount of exposure that has been decided so as to be suited to display of the through-the-lens image, and the shooting scene is discriminated. This is performed until the shutter-release switch 2 is pushed through the first step of its stroke. When the shutter-release switch 2 is pushed through the first step of its stroke, the amount of exposure is decided using the program diagram suited to the shooting scene discriminated and focusing control is carried using the image data representing the image of the subject that has been captured based upon the amount of exposure decided. The shooting scene is discriminated again using image data obtained by shooting the subject at the position of the imaging lens positioned by focusing control. The amount of exposure for shooting the image of the subject for the purpose of recording is decided using the program for the shooting scene discriminated. Shooting for the purpose of recording is carried out based upon the amount of exposure decided.

If the shooting mode is set ("YES" at step 41), the subject is shot repeatedly and image data representing the image of the subject is output at a fixed period (step 42). Calculation of a photometric value and setting of exposure are carried out every imaging period using one frame of image data that is output whenever shooting is performed one time (step 43), as described earlier, and the image of the subject displayed is changed over at the shooting period. Further, first shooting scene discrimination is carried out (step 44), as described above, using the image data obtained by shooting. Shooting scene discrimination may be performed repeatedly in conformity with the shooting period if possible or may be performed repeatedly at a period longer than the shooting period. The processing of steps 42 to 44 is executed repeatedly until the shutter-release switch 2 is pushed through the first step of its stroke (step 45).

If the shutter-release switch 2 is pushed through the first step of its stroke ("YES" at step 45), a photometric value is calculated using the image data that has been obtained by shooting the subject (this is a first photometric value calculation following pushing of the shutter-release switch 2 through its first step) (step 46). The calculation of the photometric value is performed using three frames of image data obtained by shooting the subject three times while changing the amount of exposure, as illustrated in FIGS. 2B and 4B. Of course, the number of times shooting is performed is not limited to three times and may be two times or four times or more, and the photometric value may be calculated using the number of frames of image data obtained in accordance with the number of times shooting is performed. Further, it may be so arranged that the photometric value is calculated using one frame of image data obtained by shooting a single time. In a case where a photometric value is calculated using a plurality of frames of image data obtained by shooting a plurality of times (or one time), the image data obtained by shooting a plurality of times would be stored in the memory (image memory) 19 temporarily and would be read out as necessary.

Next, the amount of exposure (f-stop number and shutter speed) corresponding to the calculated photometric value is decided (this is a first exposure amount decision) (step 47) using the program diagram suited to the shooting scene discriminated immediately before the shutter-release switch 2 is pushed through its first step (although the timing need not necessarily be immediately before the half-push is performed). It goes without saying that the shooting scene discriminated has been stored as necessary).

If the first exposure amount is decided, exposure is controlled so as to attain the decided amount of exposure and the subject is shot (first shooting control) (step 48). Focus control for positioning the imaging lens 4 is carried out based upon the image data obtained by shooting the subject under first shooting control (step 49). When the imaging lens 4 is positioned, the shooting scene is discriminated again in order to select the program diagram used to decide the amount of exposure for recording. The subject is shot again at an exposure that will result in the first amount of exposure in order to discriminate the shooting scene again (second shooting control) (step 50). A second shooting scene discrimination is performed using the image data obtained shooting under second shooting control (step 51). The amount of shooting exposure for obtaining image data for recording purposes is decided using the program diagram for the shooting scene discriminated by the second shooting scene discrimination (second exposure amount decision) (step 52).

If the shutter-release switch 2 is pushed through the second step of its stroke ("YES" at step 53), exposure is controlled so as to attain the second amount of exposure decided and the subject is shot at the position of the focusing lens (step 54). The image data obtained by shooting is recorded on the recording medium (step 55).

For example, in a case where the portrait shooting scene has been discriminated by first shooting scene discrimination immediately before the shutter-release switch 2 is pushed through the first step, the program diagram for portrait shooting scene shown in FIG. 5A is used when the first amount of exposure is decided. However, in a case where the night shooting scene has been discriminated by second shooting scene discrimination after the shutter-release switch 2 is pushed through its first step, the program diagram for night shooting shown in FIG. 5B when the second amount of exposure is decided. Even in a case where the shooting scene changes between the first shooting scene and the second shooting scene, the appropriate shooting scene can be discriminated and the amount of exposure for recording purposes can be decided using the appropriate program diagram. It goes without saying that the amount of exposure can be decided using the appropriate program diagram in similar fashion not only when there is change in shooting scene between the portrait shooting scene and the night shooting scene but also when there is a change between other shooting scenes.

Figure 8:
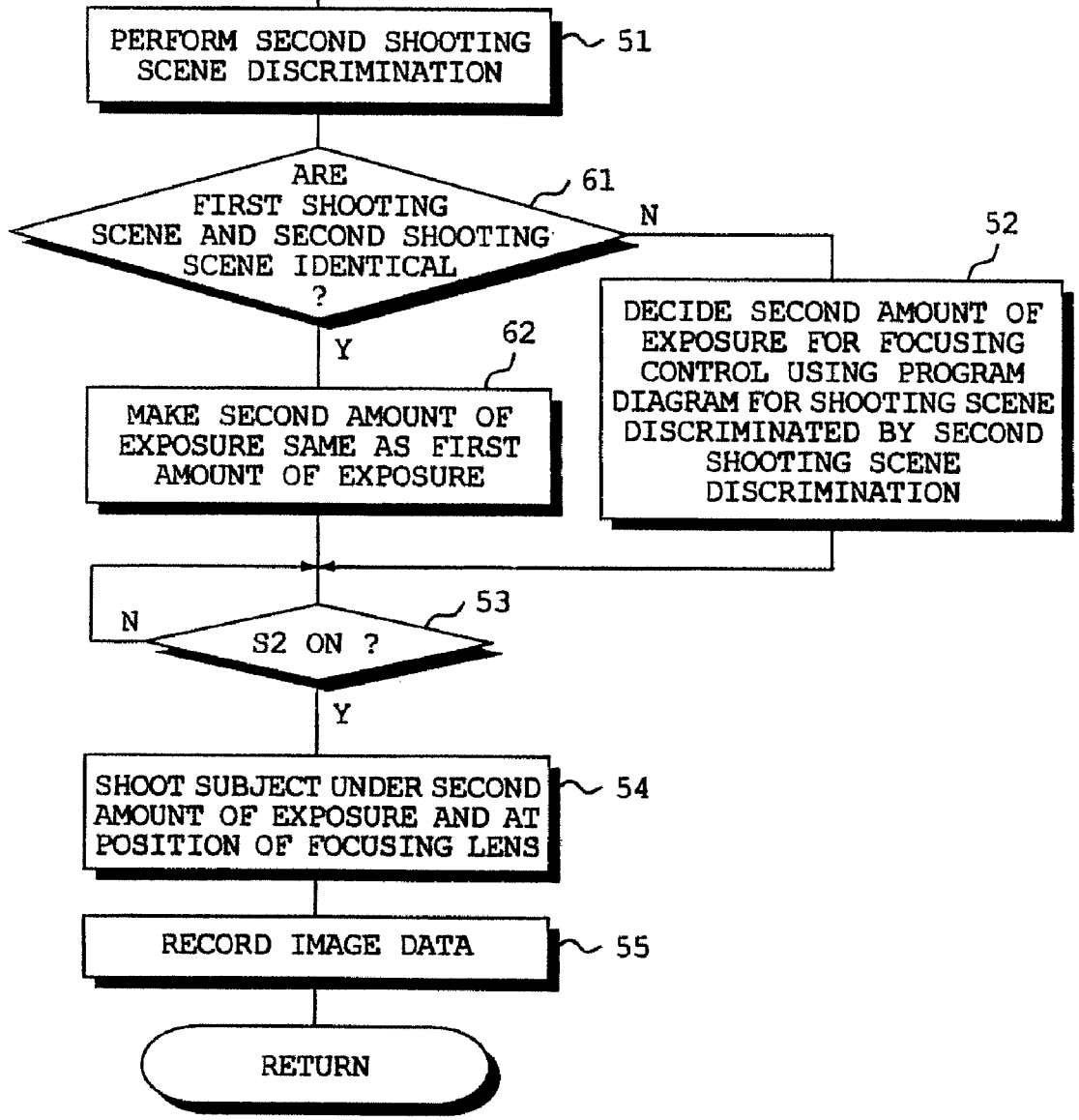

FIG. 8 illustrates a portion of processing executed by a digital still camera according to another embodiment of the present invention. Processing steps in FIG. 8 identical with those of FIG. 7 are designated by like step numbers and need not be described again.

When second shooting scene discrimination is performed (step 51), it is determined whether the shooting scene discriminated by the first shooting scene discrimination and the shooting scene discriminated by the first shooting scene discrimination are the same (step 61). If they are the same ("YES" at step 61), the second amount of exposure is set to be the same as the first amount of exposure (step 62). Since processing for deciding the second amount of exposure is unnecessary, rapid processing can be implemented. If the discriminated shooting scenes are not the same ("NO" at step 61), the second amount of exposure for recording purposes is decided using the program diagram for the shooting scene discriminated by the second shooting scene discrimination (step 52).

Figure 9:
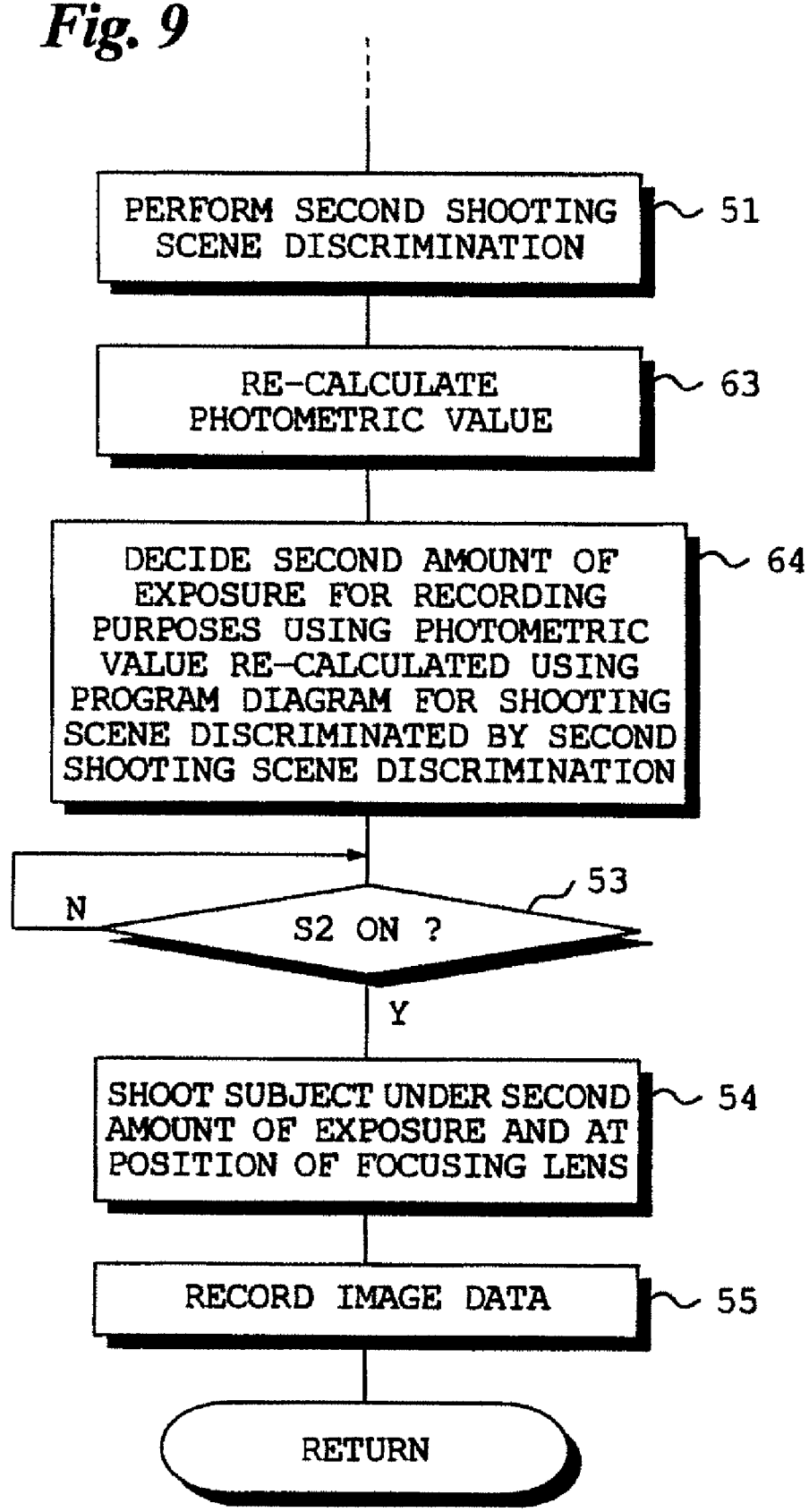

FIG. 9 illustrates a portion of processing executed by a digital still camera according to a modification. Processing steps in FIG. 9 identical with those of FIG. 7 are designated by like step numbers and need not be described again.

In the processing described above, the amount of exposure suited to a photometric value calculated after the shutter-release switch 2 is pushed through its first step is decided using the program diagram discriminated by the second shooting scene discrimination. In this modification, however, a photometric value is calculated again after the second shooting scene discrimination (step 63). The amount of exposure suited to the re-calculated photometric value is decided from the program diagram discriminated by the second shooting scene discrimination (step 64). Since exposure is performed again immediately before the amount of exposure is decided, a more accurate amount of exposure can be calculated. The photometric value that is re-calculated may be calculated using a plurality of frames of image data obtained by shooting a plurality of times while exposure is changed, or it may be calculated using one frame of image data obtained by shooting a single time.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera comprising:
   a shutter-release button of two-step stroke type;
   an image sensing device for repeatedly imaging a subject and outputting image data, which represents the image of the subject, at a fixed period in accordance with setting of a shooting mode;
   a shooting scene discriminating device for performing a first shooting scene discrimination of the subject of the image represented by the image data that has been output from said image sensing device;
   a photometric value calculating device responsive to pushing of said shutter-release button through a first step thereof for calculating a photometric value representing subject luminance using the image data that has been output from said image sensing device;
   an exposure amount deciding device for deciding a first amount of exposure, which corresponds to the photometric value calculated by said photometric value calculating device, using a program diagram for the shooting scene discriminated by said first shooting scene discrimination;
   a shooting control device for performing a first controlling of the image sensing device so as to image the subject at the first amount of exposure decided by said exposure amount deciding device; and
   a focusing control device for positioning an imaging lens based upon image data that has been output from said image sensing device by shooting the subject under the first controlling of said shooting control device,
   wherein said shooting control device performs a second controlling of said image sensing device in such a manner that the amount of exposure will become the first amount of exposure decided by said exposure amount deciding device and the subject will be shot at a position where the imaging lens has been positioned by said focusing control device,
   wherein said shooting scene discriminating device performs a second shooting scene discrimination of the subject represented by image data that has been output from said image sensing device by shooting the subject under the second controlling of said shooting control device,
   wherein said exposure amount deciding device decides a second amount of exposure, which corresponds to the photometric value calculated by said photometric value calculating device, using a program diagram for the shooting scene discriminated by said second shooting scene discrimination,
   wherein said shooting control device, responsive to pushing of said shutter-release button through a second step thereof, performs a third controlling of said image sensing device so as to image the subject at the second amount of exposure decided by said exposure amount deciding device, and
   wherein the digital still camera further comprises a recording control device for recording image data, which is output from said image sensing device by shooting the subject under the control of said third controlling, on a recording medium.

2. The digital still camera according to claim 1, further comprising:
   a scene determination device for determining whether the shooting scene discriminated by said first shooting scene discrimination and the shooting scene discriminated by said second shooting scene discrimination are a same shooting scene; and a device responsive to a determination by said scene determination device that the shooting scenes are the same shooting scene for controlling said exposure amount deciding device so as to halt exposure amount decision processing, and controlling said image control device so as to image the subject at the first amount of exposure decided by said exposure amount deciding device.

3. The digital still camera according to claim 1, wherein said photometric value calculating device, which, responsive to the fact that the shooting scene has been discriminated by said second shooting scene discrimination, calculates a second photometric value representing subject luminance, and wherein said exposure amount deciding device decides an amount of exposure, which corresponds to the second photometric value calculated by said photometric value calculating device, using the program diagram for the shooting scene discriminated by said second shooting scene discrimination.

4. The digital still camera according to claim 1, wherein said photometric value calculating device calculates a photometric value representing subject luminance using a plurality of frames of image data that have been output from said image sensing device by performing imaging a plurality of times.

5. The digital still camera according to claim 1, further comprising an image memory responsive to pushing of said shutter-release button through the first step thereof for storing the image data that has been output from said image sensing device;

wherein said photometric value calculating device calculates a photometric value representing subject luminance using the image data that has been stored in said image memory.

6. A method of controlling a digital still camera comprising:

an image sensing device repeatedly imaging a subject and outputting image data, which represents the image of the subject, at a fixed period in accordance with setting of a shooting mode;

a shooting scene discriminating device performing a first shooting scene discrimination of the subject of the image represented by the image data that has been output from the image sensing device;

in response to pushing of a shutter-release button through a first step thereof, a photometric value calculating device calculating a photometric value representing subject luminance using the image data that has been output from the image sensing device;

an exposure amount deciding device deciding a first amount of exposure, which corresponds to the photometric value calculated by the photometric value calculating device, using a program diagram for the shooting scene discriminated by the first shooting scene discrimination;

a shooting control device performing a first controlling of the image sensing device so as to image the subject at the first amount of exposure decided by the exposure amount deciding device;

a focusing control device positioning an imaging lens based upon image data that has been output from the image sensing device by shooting the subject under the first controlling of the shooting control device;

the shooting control device performing a second controlling of the image sensing device in such a manner that the amount of exposure will become the first amount of exposure decided by the exposure amount deciding device and the subject will be shot at a position where the imaging lens has been positioned by the focusing control device;

the shooting scene discriminating device performing a second shooting scene discrimination of the subject represented by image data that has been output from the image sensing device by shooting the subject under the second controlling of the shooting control device;

the exposure amount deciding device deciding a second amount of exposure, which corresponds to the photometric value calculated by the photometric value calculating device, using a program diagram for the shooting scene discriminated by the second shooting scene discrimination;

in response to pushing of the shutter-release button through a second step thereof, the shooting control device performing a third controlling of the image sensing device so as to image the subject at the second amount of exposure decided by the exposure amount deciding device; and a recording control device recording image data, which is output from the image sensing device by shooting the subject under the third controlling of the shooting control device, on a recording medium.

* * * * *